Feb. 14, 1950     H. L. FRICK     2,497,815
FLUID PRESSURE ACTUATED MOTOR FOR VEHICLE BRAKES
Filed Feb. 1, 1946
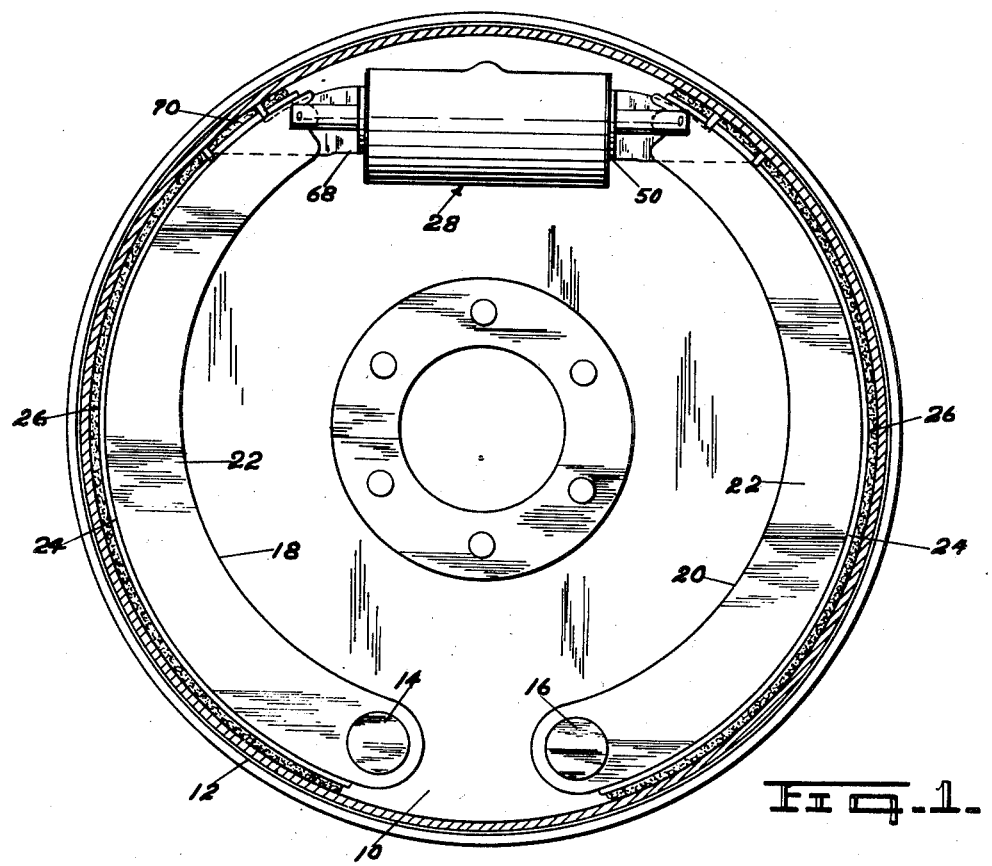
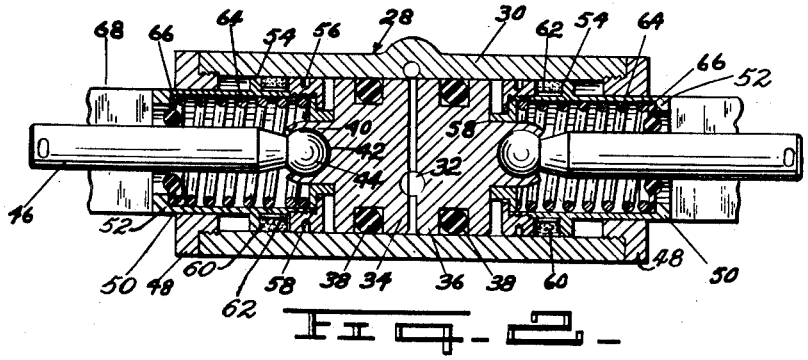
INVENTOR
HAROLD L. FRICK
BY *C. H. Fowler*
ATTORNEY Patented Feb. 14, 1950

2,497,815

UNITED STATES PATENT OFFICE 2,497,815

FLUID PRESSURE ACTUATED MOTOR FOR VEHICLE BRAKES

Harold L. Frick, Detroit, Mich., assignor to Hydraulic Brake Company, a corporation of California Application February 1, 1946, Serial No. 644,732

4 Claims. (Cl. 188—79.5)

This invention relates to brakes and more particularly to brakes for motor vehicles.

Heretofore, a brake for motor vehicles has included a fixed support, a rotatable drum associated therewith and friction elements on the support movable either mechanically or hydraulically into engagement with the drum against the resistance of a retractile spring connected between the friction elements, and generally retractile stops and steady rests for the friction elements are mounted on the fixed supports, and in some instances the brake is further encumbered by automatic adjustment means for the friction elements universally carried by the friction elements and cooperating with fixed or adjustable stops on the fixed support.

The retractile spring, the stops, the steady rests and the automatic adjusters for the friction elements not only crowd the interior of the brake and this complicates the assembly thereof, but are a source of menace in that they collect dust, dirt and other foreign substances causing rust and corrosion with the resultant inoperativeness of the brake.

An object of the invention is to simplify the structure of a brake for motor vehicles, and particularly that type of brake generally known in the art as an internal expanding brake.

Another object of the invention is to provide a brake for motor vehicles having the least number of parts essential for efficient operation thereof.

Another object of the invention is to provide a brake for a motor vehicle which may be easily and quickly assembled by unskilled labor.

Another object of the invention is to provide a brake for motor vehicles in which the essential instrumentalities for actuation and automatic adjustment of the friction elements of the brake are contained in a single unit.

Yet another object of the invention is to provide a brake for motor vehicles wherein the friction elements of the brake are actuated by a fluid pressure actuated motor having therein retractile springs for returning the friction elements to their respective positions of rest and also automatic adjustment means for the friction elements.

A further object of the invention is to provide a brake for motor vehicles wherein a fluid pressure actuated motor has therein all essential elements for efficient operation and automatic adjustment of the friction elements of the brakes.

Other objects and advantages of the invention will hereafter appear from the following description when taken in connection with the accompanying drawings forming a part of this specification, and in which:

Fig. 1 is a vertical sectional view of a brake embodying the invention, and,

Fig. 2 is an enlarged sectional view of the fluid pressure actuated motor for control of the friction elements of the brake.

In the illustrated embodiment of the invention 10 represents a fixed support or a backing plate adapted to be secured to an axle or an axle housing and associated with the backing plate is a rotatable drum 12 adapted to be secured to a wheel.

The backing plate has arranged thereon spaced anchors 14 and 16, and a pair of corresponding interchangeable friction elements or shoes 18 and 20 have their articulate ends pivoted on the anchors 14 and 16. Each of the shoes includes a web 22 supporting a rim 24 having suitably secured thereon a friction lining 26.

A fluid pressure actuated motor indicated generally at 28 is fixedly secured on the backing plate 10 between the force applying ends of the shoes 18 and 20. The motor includes a cylinder 30 having a port 32 located substantially centrally with respect to the length thereof.

The cylinder has therein corresponding oppositely disposed pistons 34 and 36. Each of the pistons has a circumferential groove for the reception of a sealing ring 38 suitable for inhibiting seepage of fluid past the piston, and a boss 40 on the back of the piston has a socket 42 for the reception of a ball 44 held against displacement as by turning the wall defining the socket and thrust rods 46 made integral with the balls serve to connect the pistons to the friction elements or shoes.

Rings 48 threaded in the respective ends of the cylinder 28 support for reciprocation corresponding sleeves 50 having internal shoulders 52 and peripheral flanges 54 complementary to the bore of the cylinder, and stop rings 56 threaded thereon in spaced relation to the flanges. The rings 56 have flanges adapted to interlock with rings 58 press fitted on the bosses 40 of the pistons.

Friction elements 60 fitted between the flanges 54 and the rings 56 are pressed against the wall of the cylinder as by springs 62 interposed between the friction elements and the sleeve. These friction elements serve to retain the sleeves in adjusted positions, and retractile springs 64 are fitted in the sleeves 50 between the shoulders 52 on the sleeves and the rings 58 on the boss of the cylinder with dust shields 66 clamped between the springs and the shoulders 52 and embracing the thrust pins 46 for the exclusion of dust and other foreign substances from the cylinder.

Each of the sleeves 50 has thereon spaced arms 68 adapted to straddle the friction elements or shoes 18 and 20 and to support blocks 70 adapted to engage the drum 12 through openings in the shoe adjacent the force applying ends thereof.

In a normal operation of the brake upon entry of fluid under pressure into the cylinder 30 of the motor, the pistons 34 and 36 thereof are moved in opposite directions, against the resistance of the retractile springs 64 and during this movement of the pistons force is transmitted through the thrust pins 46 to the friction elements 18 and 20 causing movement of the friction elements into engagement with the drum 12 with resultant retardation of rotation of the drum.

During this operation, the sleeves 50 move concomitantly with the thrust pins 46 under the influence of the springs 64 interposed between the pistons and the sleeves 50, and during this movement of the sleeves force is transmitted through the spaced arms 68 to the blocks 70 causing the blocks to engage the drum 12 simultaneously with the friction elements though with considerable less pressure due to the tension of the springs 64 and as the blocks 70 engage the drum the clearances between the frictional stop rings 62 and the stops 56 on the sleeves 50 is taken up.

The linings 26 of the friction elements are subjected to the usual wear incident to a braking operation and the wear on the blocks due to their low co-efficient of friction is negligible.

Because of this differential in the frictional coefficient of the linings 26 and the blocks 70 and also the differential in applied pressure of the linings 26 and the blocks 70 a substantial differential in wear between the linings and the blocks is effected and this results in relative movement between the friction elements 18 and 20 and the blocks 70 proportionately to the differential in wear.

As the differential in wear on the linings 26 and the blocks 70 progresses the frictional stop rings 62 are moved to new positions effective to adjust the stops 56 so as to maintain the friction elements in proper spaced relation to the drum.

Upon conclusion of a braking operation and release of pressure on the fluid in the cylinder 30 of the motor, the pistons 34 and 36 return to their retracted positions under the influence of the springs 64 where the flanges 58 seat on the stop rings 56.

When operating under a condition of extreme heat, due to a severe brake operation resulting in drum distortion the frictional stop rings may be shifted to such an extent as to over adjust the stops 56 and accordingly the friction elements 18 and 20. However, should this condition occur, upon release of the friction elements and the return thereof to their retracted positions proper clearance between the friction elements and the drum is maintained because as the drum cools it applies force to the blocks 70 resulting in shifting the frictional stop rings 62 so as to hold the stops 56 in position for support of the friction elements in proper spaced relation to the drum.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a movable member, a friction element movable into engagement therewith, fluid pressure means for actuating the friction element, means in the fluid pressure means for retracting the friction element and shiftable means in the fluid pressure means for determining the retracted position of the friction element having a part adapted to frictionally engage the movable member and to be shifted as a result of a differential in movement between the friction element and the shiftable means.

2. A brake comprising a rotatable drum, a friction element for cooperation therewith, means for actuating the friction element, means in the actuating means for retracting the friction element, and shiftable means in the actuating means cooperating with the drum and movable thereby relative to the friction element as the result of wear of the friction element to effectively determine the retracted position of the friction element.

3. A brake comprising a rotatable drum, a friction element for cooperation therewith, a motor for actuating the element, a member frictionally gripped in the motor for determining the retracted position of the friction element having a wear resistance part adapted to engage the drum and shiftable in the motor as a result of a differential in wear between the friction element and the wear resistance part, cooperative stops on the motor and member and means in the motor for retracting the friction element.

4. A brake comprising a rotatable drum, a pair of friction elements for cooperation therewith, a motor for actuating the elements, corresponding members frictionally gripped in the motor for determining the retracted position of the friction elements, said members having wear resistance parts adapted to engage the drum and shiftable in the motor as a result of a differential in wear between the friction elements and the wear resistance parts, cooperative stops carried by the motor and members and means in the motor for retracting the friction elements.

HAROLD L. FRICK.

REFERENCES CITED

The following references are of record in the file of this patent:

UNITED STATES PATENTS

| Number | Name | Date |
|---|---|---|
| 2,175,446 | Rasmussen et al. | Oct. 10, 1939 |
| 2,242,685 | Swift | May 20, 1941 |